Oct. 8, 1957 C. R. BUSCH 2,808,906
SELF-CENTERING RAILWAY CAR BRAKE BEAM
Filed Aug. 30, 1954 2 Sheets-Sheet 1
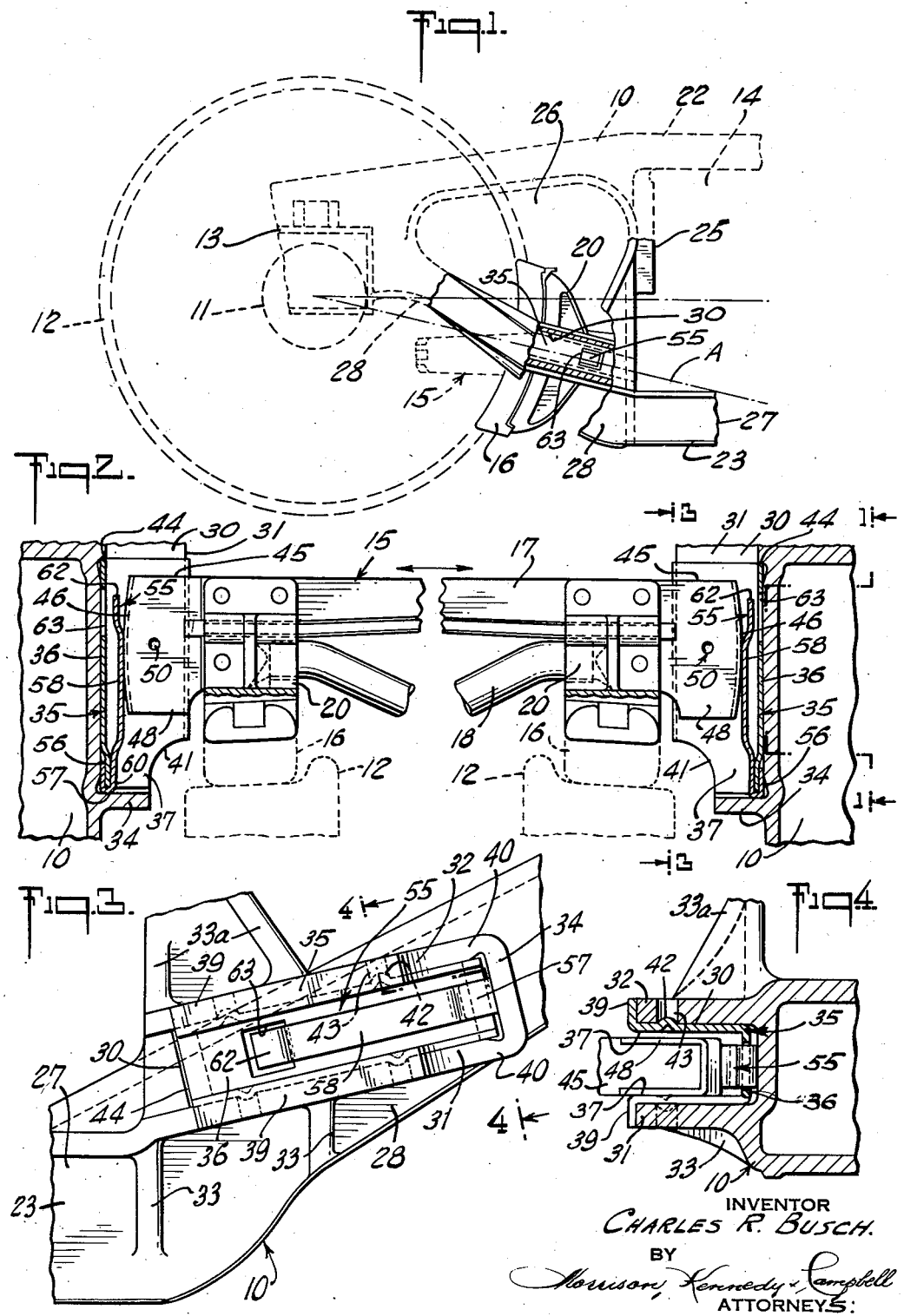
INVENTOR
CHARLES R. BUSCH.
BY
Morrison, Kennedy, Campbell
ATTORNEYS:

Oct. 8, 1957 C. R. BUSCH 2,808,906
SELF-CENTERING RAILWAY CAR BRAKE BEAM
Filed Aug. 30, 1954 2 Sheets-Sheet 2
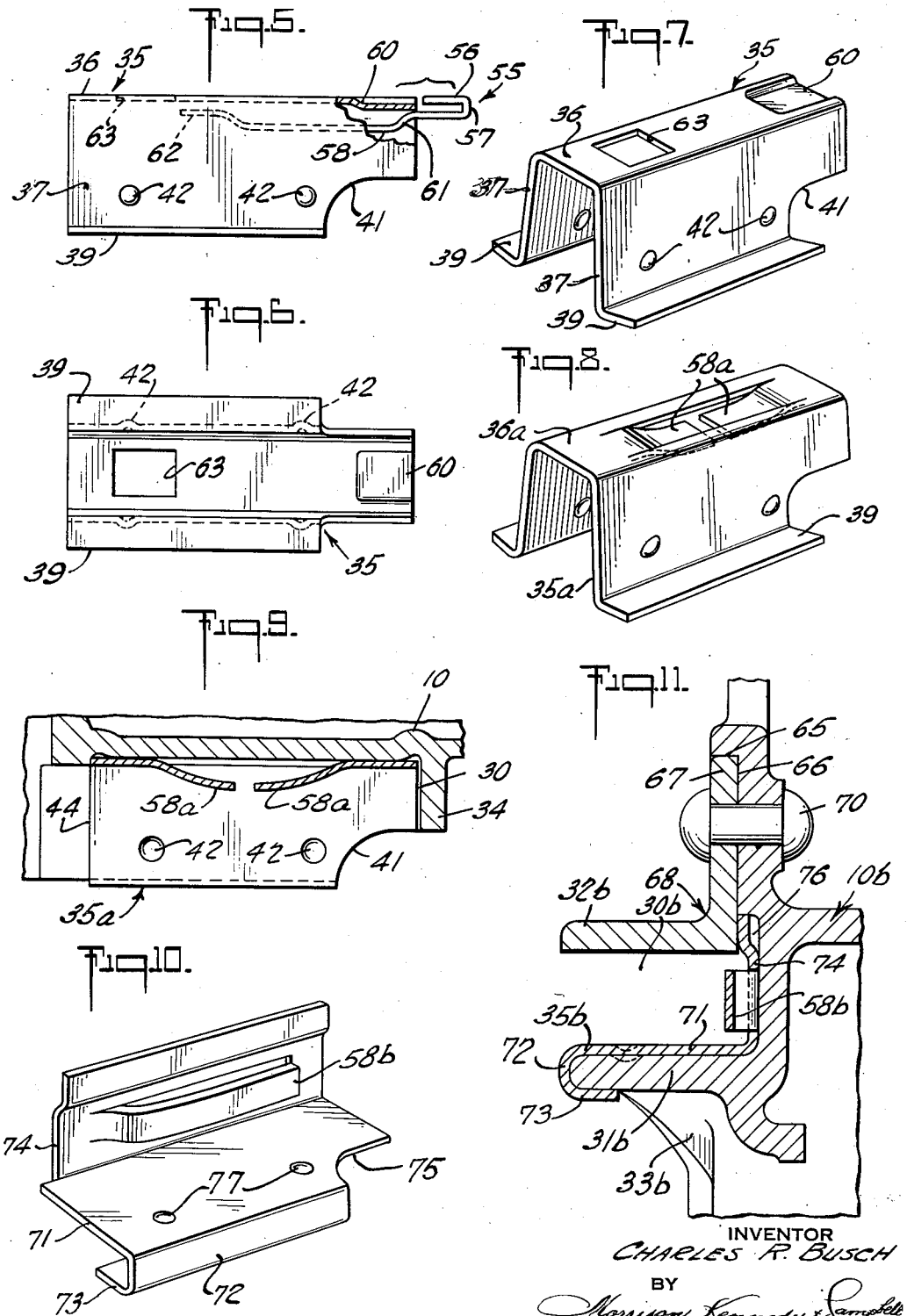
INVENTOR
CHARLES R. BUSCH
BY
Morrison, Kennedy & Campbell
ATTORNEYS

United States Patent Office 2,808,906
Patented Oct. 8, 1957

2,808,906

SELF-CENTERING RAILWAY CAR BRAKE BEAM

Charles R. Busch, Orange, N. J., assignor to Buffalo Brake Beam Company, a corporation of New York Application August 30, 1954, Serial No. 452,806

18 Claims. (Cl. 188—190)

The present invention relates to railway car trucks and more particularly to the means for supporting and guiding the ends of a brake beam on the side frames of the truck. The invention is an improvement over the brake beam supporting and guiding means shown and claimed in my prior United States Patents Nos. 2,170,123 and 2,282,558.

A conventional type of railway car truck, adapted especially for use with freight cars, comprises a pair of side frames supporting two of the wheel axles, a bolster extending crosswise between the side frames with its ends guided and spring-supported in the side frames, and a pair of brake beams, one for each pair of coaxial car wheels, extending between the side frames and supported therefrom for movement towards and away from the corresponding wheel axles. Each of these brake beams carries at its opposite ends brake heads for brake shoes adapted to be applied to the treads of the corresponding car wheels upon movement of the brake beam towards the axle of the car wheels.

For supporting each brake beam and guiding it towards and away from the adjacent car wheels, the side frames are provided on their inboard sides with channel-shaped recesses to slidably receive the ends of the brake beams. Since at least some parts of the guiding walls of the recesses are made integral with the side frames and since, in most cases, these side frames are formed by casting or other processes which do not lend themselves easily to the formation of hard finished surfaces, the recesses must be conditioned for sliding engagement with the ends of the brake beams by means of hard metal linings or wear plates inserted in said recesses. These hard metal linings shown in the aforesaid patents have been found to be satisfactory under certain conditions.

It is necessary in the design of freight cars to provide for lateral play of the wheels and axles transverse to the side frames. In a freight car so designed, as the car rolls down the rails, the wheels move laterally side to side relative to the side frames, causing first the flange of the wheel of one coaxial set to contact its supporting rail and then the flange of the other wheel of said set to contact the other rail. The brake beams are also allowed to move laterally between the side frames to follow the wheels in their lateral movement during a brake application. When the brakes are released, the brake beams will back away from the wheels while retaining the same lateral position with respect to the side frames they had just before release of the brakes and will remain in that relative position until the next brake application. This condition may leave either of the brake beams in such extreme off-center lateral position with respect to the side frames, as to cause one of its brake shoes to ride against the flange of the adjacent wheel.

One object of the present invention is to provide means for centering a brake beam laterally with respect to the side frames upon release of the brakes carried by said beam, without interfering with the free movement of said brake beam laterally between said side frames, upon the application of the brakes, to follow the lateral movement of the wheels.

In accordance with certain features of the invention for carrying out the aforesaid object, the wear plates for lining the guide recesses in the inboard sides of the side frames are provided with attached or integral springs in the form of fingers adapted to engage resiliently the ends of the brake beam and tending to center the brake beam laterally with respect to the side frames. These springs are resilient enough to yield and permit the brake shoes to follow the car wheels upon application of the braking pressure.

Other objects, features and advantages of the invention are apparent from the following description and from the accompanying drawings, in which:

Fig. 1 is a side elevation, partly in section, of a railway car truck containing one form of brake beam supporting and guiding means having one-piece U-shaped wear plates with separate but attached brake beam centering springs, the side frame observable in this view being shown partly in broken lines and partly in section, the view being taken approximately along the lines 1—1 of Fig. 2;

Fig. 2 is a transverse section of the car truck shown in Fig. 1 taken through the center plane of a pair of opposed guide recesses on the side frames of the truck and showing the brake beam between the side frames in centered brake released position;

Fig. 3 is a detail section of one of the side frames of Figs. 1 and 2, taken along the lines 3—3 of Fig. 2 and showing the wear plate with attached beam centering spring in position in the guide recess of said side frame but without the end of the brake beam in said recess;

Fig. 4 is a detail section of the side frame of Figs. 1 and 2 taken along the lines 4—4 of Fig. 3 but showing the brake beam in the guide recess;

Fig. 5 is a top plan view of the recess wear plate of Figs. 1 and 2 but shown with the beam centering spring detached therefrom and in position to be applied thereto;

Fig. 6 is a side elevation of the recess wear plate of Fig. 5, but shown without the spring;

Fig. 7 is a perspective of the wear plate shown in Figs. 5 and 6 without the spring;

Fig. 8 is a perspective of another form of one-piece U-shaped recess wear plate embodying the present invention and provided with a pair of beam centering spring fingers integral with and stamped out of the wear plate;

Fig. 9 is a detail section of a car truck showing the recess wear plate of Fig. 8 in operative position in the side frame recess;

Fig. 10 is a perspective of still another form of recess wear plate embodying the present invention and provided with a single beam centering spring finger integral with and stamped out of the wear plate; and Fig. 11 is a detail section of a car truck showing the recess wear plate of Fig. 10 in operative position in the side frame recess.

Referring to Figs. 1 and 2 of the drawings, there is shown the general conventional assembly of a railway car truck to which the present invention may be applied. This truck assembly comprises a pair of side frames 10 for supporting the axles 11 of flanged car wheels 12 through suitable journal boxes 13 in said side frames. Each of these side frame 10 is in the form of a truss and has a center opening 14 which is adapted to receive one end of the usual bolster (not shown) connected to the bottom of the car (not shown). Extending between the two side frames 10 and supported thereon for guide movement therealong is a pair of brake beams 15 carrying brake shoes 16 for engagement with the car wheels 12 in braking position and operated into and out of wheel braking position by a linkage mechanism (not shown) such as that shown in my prior United States Patent No. 2,170,112, Each of these brake beams 15 is shown comprising a cambered compression member 17, a tension member 18 bent in the form of a wide V and connected at its ends to the ends of the compression member by integral formation at these ends or by the use of locking devices, a strut (not shown) between the apex of the tension member and the midsection of the compression member for maintaining tension in the tension member and camber in the compression member, and brake heads 20 at the ends of the brake beam and carrying the brake shoes 16.

Each of the side frames 10 is in one piece and usually of cast steel and comprises an upper compression member 22, a lower tension member 23 merging at its ends into the ends of the compression member, journal boxes 13 for the wheel axles 11 at these merging ends, and upright struts 25 located between the compression member and the tension member and defining therewith the center bolster opening 14 and windows 26 flanking said bolster opening. The tension member 23 has a middle horizontal chord or section 27 below the bolster opening 14 and side sections 28 diverging upwardly from the ends of the middle section and inclined toward the ends of the compression member 22 where they merge with the compression member.

For supporting and guiding the brake beams 15 on and along the side frames 10, each of these side frames has on its inboard side two straight channel-like recesses 30, on the opposite sides of the bolster opening 14, for slidably receiving the ends of the brake beams. In the specific form of the invention shown in Figs. 1 to 4, each of these recesses 30 is formed by side walls or flanges 31 and 32 integral with the side frame 10 and extends from a point near the lower region of the adjacent side frame strut 25 and along a portion of the corresponding side section 28 of the tension member 23 in an inclined direction along a line A passing through the center of the adjacent wheel axle 11, this direction line usually extending at an angle of approximately 12 degrees to the horizontal. These recess walls 31 and 32 spaced one above the other are cast or otherwise formed integral with the side frames 10 and inasmuch as the weight of the brake beam 15 will be imposed upon the bottom recess wall 31, this wall is reinforced and strengthened by means of brackets 33 integral with the side frame. Since the brake beam 15 is to be confined in its guided movements and as an upward thrust therefrom will be transmitted to the upper recess wall 32, this wall is similarly reinforced by brackets 33a integral with the side frame 10. That end of each recess 30 which is nearest to the corresponding wheel 12 is closed by a transverse wall 34 located between the two spaced recess walls 31 and 32 and integral with the latter walls as well as with the side frame 10 to prevent the brake beam 15 from falling out when moved in one direction and to serve as an abutment for the wear plate 35 to be described. The opposite ends of the recesses 30 are left open to permit removal of the brake beam 15 from the side frames 10 when that is desired.

In view of the fact that the side frames 10 are cast and the recess walls 31 and 32 are cast therein, the inner confronting faces of these walls are not hard enough or smooth enough to adapt them suitably to withstand the slide movement of the ends of the brake beams 15 thereagainst. For that reason, each guide recess 30 is provided with a hard metal lining 35, which, in the form of the invention shown in Figs. 1 to 7, is a removable one-piece channel-like or trough-shaped wear plate fitting within the recess in truck assembled position. This wear plate 35 is die-pressed into channel form from heavy sheet spring steel stock, heat-treated, tempered and drawn to give it the necessary wear-resisting and resilient properties and comprises an outer or back wall 36 for protecting the corresponding back wall of the guide recess 30 and two spaced opposed side walls 37 for protecting the lower wall 31 and upper wall 32 respectively of the recess. Like the recess 30 in which it fits, the wear plate 35 is open at its inner or front side to receive the guiding end extension 45 of the brake beam 15. At its front or open side, the walls 37 of the wear plate 35 have oppositely-bent flanges 39 adapted to engage the front edges of the recess walls 31 and 32 in fitted position of the wear plate 35 in the recess 30.

The guide recess walls 31 and 32 are cut away at 40 directly opposite the tread of the adjacent wheel 12 to clear said wheel, even under extreme conditions of lateral movement of the wheels between the side frames 10, and the side walls 37 of the wear plate 35 are correspondingly formed with notches 41 for registry with the cut-away areas of these recess walls.

To latch and thereby retain the wear plate 35 in its recess 30 for use, while permitting the wear plate to be removed for replacement when it becomes worn out, the side walls 37 of the wear plate have protuberances 42 and the guide recess walls 31 and 32 have holes 43 into which these protuberances snap when the wear plate is inserted in position in the recess. The back wall of the guide recess 30 presents a shoulder 44 and the wear plate 35 is retained in said recess against endwise movement between the end closure wall 34 of the recess and the shoulder 44, as shown in Fig. 2.

Each brake beam 15 at each of its ends has an extension 45 beyond the corresponding brake head 20, cast or forged and flattened into rectangular oblong cross-section. The end surfaces 46 of these brake beam extensions 45 are slightly curved outwardly in arcs of large radius and are covered at their upper and lower surfaces and at their end surfaces with suitable hard metal to protect these extensions against wear. These wear surfaces may be provided, for example, with a sheet of hard spring metal bent in the form of a U-shaped wear plate 48 having its back wall curved to follow the curvature of the end surface 46 of the beam extension 45 and provided with protuberances 50 for latch engagement with depressions in the beam extension. The curved ends 46 on the brake beam 15 permit these brake beams to adjust themselves readily to correct alignment regardless of wheel or brake shoe inequality or any inequality in the wear of these members and prevent any such inequalities from imposing destructive stresses on certain parts of the car truck.

The construction so far described forms per se no part of the present invention and is disclosed in my aforesaid Patent No. 2,170,112.

The inner confronting faces of the recess walls 31 and 32 are parallel and the distance therebetween may vary because of the greater tolerances deliberately allowed in casting. To permit a wear plate 35 of definite size to fit adequately any guide recess 30 varying in size due to ordinary manufacturing tolerances, the side walls 37 of the wear plate are not parallel but are flared outward and disposed at an obtuse angle of about 93° with respect to the back wall 36 of the wear plate. Hence, the outside width of the wear plate 35 is non-uniform and varies continuously from a minimum at its back wall 36 to a maximum at the open front. This variation in outside width of the wear plate 35 fixes the range of width variation in the guide recess 30. Thus, the outside width of the wear plate 35 at the back wall 36 approximates but is slightly less than the minimum inside width of the guide recess 30, while the outside width of the wear plate 35 at its wider open side is slightly greater than the maximum inside width of the guide recess. In a specific example of dimensions which may be used in commercial installations and which represent a practical and successful embodiment of the invention, the minimum width of the guide recess 30 would be 2″, whereas the maximum width would be 2$\frac{3}{32}$″. Hence, the tolerance range is $\frac{3}{32}$″, which is quite substantial and which will take care of all casting variations that may occur in actual foundry practice. Since the wear plate 35 is die-pressed, it may be strictly controlled. In the specific example, the outside width of the wear plate 35 at the back wall 36 would be 1 31/32", which is only 1/32" less than the minimum inside width of the guide recess 30 and 4/32" less than the maximum inside width of the recess. The outside width of the wear plate 35 at its open wider side is slightly more than 2 5/32". The actual thickness of the wear plate 35, in a specific example, would be 3/16".

As a result of the flared-wall construction of the wear plate 35 described, this wear plate when in position in the recess 30 is never loose or in repose in said recess, being forced when driven into the recess from its die-pressed unsprung condition, as shown in Fig. 7, to its sprung stressed condition shown in Fig. 4. Hence, there will always be a pressure fit between the wear plate 35 and the walls 31 and 32 of the recess 30 regardless of the actual width of the recess within the range of manufacturing tolerance encountered.

The wheels 12 and their axles 11 are permitted limited lateral movement in the side frames 10, so that the wheels, as they follow the rails, move from side to side laterally with first the flange of one wheel contacting its supporting rail and then the flange of the opposite wheel contacting its supporting rail. The brake beams 15 guided in the recesses 30 of the side frames 10 are also permitted lateral play between said side frames to follow the wheels 12 in their lateral movement during the application of the brakes. In a specific, practical and commercial installation, the minimum lateral play of the brake beam 15 permitted between the side frames 10 is 1/2".

Upon release of the brakes, the brake beams 15 will back away from the wheels 12 and will tend to retain the lateral position, with respect to the side frames 10, they had just before the release of the brakes. Since this brake release may occur at an instant when the coaxial wheels 12 of a wheel-set have been shifted laterally corresponding closely to an extreme off-center position, the brake beam 15 upon this brake release will tend to retain a correspondingly laterally offset position. In this offset position, one of the brake shoes on the brake beam 15 will ride against the flange of the wheel 12 adjacent to said shoe. To correct this condition, means have been provided to center each brake beam 15 between the side frames 10 automatically upon release of the brakes.

In the specific form of the invention shown in Figs. 1 to 7, the self-centering device for each brake beam 15 comprises a pair of similar springs 55 adapted to act in a pair of opposed metal-lined guide recesses 30 against the ends of the brake beam. Each of these springs 55 is separate from the corresponding wear plate 35 but is adapted to be attached thereto. The spring 55 is made from flat rectangular spring metal bar stock and has an end section 56 reversely bent in relation to the main body of the spring to form a spring clip 57 for attachment to the wear plate 35 and a finger 58 serving as a resilient abutment for one end of the brake beam 15 in the corresponding guide recess 30. For retaining the clip 57 on the wear plate 35 in attached position of the spring 55, the rear wall 36 of the wear plate is pre-formed at one end with a depression 60 into which the end section 56 of said clip nests snugly. The main body of the spring 55 is offset at 61, so that the finger 58 in attached position of the spring is bent away from the rear wall 36 of the wear plate 35, to afford the necessary clearance for the flexing of the finger under the pressing action of the brake beam 15. To allow for the maximum of lateral movement of the brake beam 15 during brake application, the free end section 62 of the spring finger 58 is offset from the main body of the spring finger and the rear wall 36 of the wear plate 35 is formed with an opening 63 opposite said end section to receive said end section, when the brake beam has been shifted off center towards said rear plate wall by the lateral movement of the wheels during the application of the brakes. This opening 63 is rectangular in shape and sufficiently larger than the offset end section 62 of the spring finger 58 to allow the spring finger to function as a bow spring, with both ends of the spring finger supported against the lateral thrust of the brake beam 15, when the spring 55 has been flexed into position to insert said end section 62 into said opening 63.

During assembly, the spring 55 is attached to the wear plate 35 to form a unit therewith, before the wear plate has been sprung and fitted into the guide recess 30, as shown in Fig. 5. In this attached position, the offset end section 56 of the spring clip 57 will be in the preformed depression 60 of the rear wall 36 of the wear plate 35 and flush with the main body of said rear plate wall. With the spring 55 clipped onto the wear plate 35, the resulting unit is then sprung into the guide recess 30. With the unit 35, 55 so fitted and seized in the guide recess 30, the offset clip end section 56 of the spring 55 will be clamped between the rear wall of the guide recess 30 and the rear wall 36 of the wear plate 35, and the spring clip 57 will be clamped against withdrawal between the end closure wall 34 of the guide recess 30 and the adjacent end of the rear wall 36 of the wear plate (see Fig. 2).

With the brake beam 15 inserted into the lined guide recesses 30 as described, the brake beam end extensions 45 with their curved surfaces 46 will bear with pressure against the two fingers 58 of the two similar springs 55 attached to the opposite wear plates 35, when the brake is not applied, so that the brake beam is maintained laterally in centered position in relation to the side frames 10, as shown in Fig. 2. Upon application of the brakes, the brake beam 15 will move towards the corresponding wheels, and the end extensions 45 of the brake beam will ride along the pressing spring fingers 58. While the brake is being applied, the brake beam is free to move laterally with the corresponding wheels 12 against the action of one or the other of the springs 55 according to the direction of movement. Upon release of the brake, the brake beam 15 as it draws away from the corresponding wheels is centered by the springs 55 laterally and automatically with respect to the side frames 10 and back into the position shown in Fig. 2.

In the construction of Figs. 1 to 7, the brake beam centering spring device is formed as a unit separate from but attachable to the wear plate 35. In the form of the invention shown in Figs. 8 and 9, a U-shaped wear plate 35a similar to the wear plate 35 is provided, the only difference being that the latter wear plate is designed to provide integral therewith the brake beam centering spring device. To this end, the back wall 36a of the wear plate 35a has cut out therefrom two similar spring fingers 58a. These spring fingers 58a, bowed out of the plane of the back wall 36a of the wear plate 35a, have their free ends in registry opposite each other and operate in the manner described in connection with the spring device of Figs. 1 to 7, to center the brake beam 15 laterally with respect to the side frame 10 when the brake is not applied and to permit the brake beam to move laterally with the wheels upon application of the brake.

In Figs. 1 to 9, the brake beam centering spring device is shown applied to the one-piece U-type of wear plate and to the integral guide structure type of side frame shown in my aforesaid Patent No. 2,170,123. In Figs. 10 and 11, the brake beam centering device is shown applied to the type of construction shown in my aforesaid Patent No. 2,282,558. In this latter patent, each side frame 10b has integral therewith on its inboard side a guide wall, flange or ledge 31b upon which the end 45 of the brake beam 15 shown in Figs. 1 and 2 is supported at each side of the truck. This guide wall 31b is reinforced by brackets 33b. A shoulder 65 located at a distance over the wall 31b defines a seat 66 for the flange 67 of an angle piece 68. The other flange 32b of this angle piece 68 forms a wall extending parallel to the wall 31b and defining therewith a guide recess 30b for the end extension 45 of the brake beam 15. This angle piece 68 is secured to the side frames 10b by means of rivets 70 or other suitable fastening means. A closure wall (not shown), integral with the side frame 10b at one end of the guide recess 30b, prevents the brake beam 15 from falling out when moved in one direction, and cut-outs or notches (not shown) formed in the ends of flanges 31b and 32b allow for proper lateral approach of the wheels to the side frames, as in the case of the cut-outs at 41 in the construction shown in Fig. 2.

To take up wear in the guide recess 30b due to the movement of the brake beam 15, a wear plate 35b of hard, tempered spring metal is provided in said recess comprising an intermediate section 71 broad enough to fit on the upper surface of the beam supporting wall 31b, a narrower down-turned section 72 adapted to fit against the front edge of said wall, a reversely turned lip 73 adapted to fit against the bottom margin of said wall, and an upturned back section 74 adapted to fit against the side frame 10b at the back wall of the recess. The end portion of the wear plate 35b is provided with a notch 75 for registry with the corresponding cut-outs (not shown) in the ends of the walls 31b and 32b, previously described. The side frame 10b has a recess 76 near the corner of the angle piece 68 into which the upper edge of the back section 74 of the wear plate 35b is retained. Small downward protuberances 77 in the intermediate section 71 of the wear plate 35b, snapped into corresponding depressions or holes in the guide recess wall 31b, retain the wear plate in position against inward displacement away from the side frame 10b. The end closure wall (not shown) at the end of the guide recess 30b integral with the side frame 10b and a shoulder (not shown) in the side frame 10b at the opposite end of the guide recess retain the wear plate 35b against endwise displacement.

The construction of Figs. 10 and 11, so far described, is shown in my aforesaid Patent No. 2,282,558. To provide the brake beam centering spring device of the present invention in connection with this patented construction, a spring finger 58b is cut out of the back wall section 74 of the wear plate 35b and stamped out of the plane of said back wall section. The spring fingers 58b in the wear plates 35b of opposed guide recesses 30b will act upon the rounded ends of the brake beam 15 and thereby center said brake beam between the side frames 10b, while the brake is released, and will yield upon application of the brake to permit lateral movement of said brake beam with the wheels between the side frames.

While the invention has been described with particular reference to specific embodiments, it is to be understood that it is not to be limited thereto, but is to be construed broadly and restricted solely by the scope of the appended claims. For example, in the broader aspects of the invention, the spring fingers could be formed at the ends of the wear plates 48 applied to the brake beam extensions 45.

What is claimed is:

1. In a car truck assembly, the combination comprising a pair of side frames for supporting a wheel axle therebetween and presenting on their inboard sides respective guide recesses, a wear plate in each of the guide recesses, a brake beam having its ends extending into the guide recesses for guide movement towards and from braking position, the guide recesses allowing limited lateral movement of the brake beam between the side frames, and a spring in each of the guide recesses connected to the corresponding wear plate in the guide recess to form a unit with the wear plate, said springs acting against the ends respectively of the brake beam to center the brake beam automatically between the side frames upon release of the brakes.

2. In a car truck assembly, the combination set forth in claim 1, wherein the spring is in the form of a finger separable from the corresponding wear plate but attached to the corresponding wear plate to form a unit therewith.

3. In a car truck assembly, the combination set forth in claim 1, wherein the spring is in the form of a finger integral with the corresponding wear plate.

4. In combination, a wear plate for one of the brake beam guide recesses of a railway car truck side frame, and a spring connected to the wear plate to form a unit therewith and located inside the corresponding guide recess in mounted position of the wear plate, said spring being adapted to engage resiliently one end of the brake beam in assembled position of the car truck and to urge the brake beam laterally away from the corresponding side frame, said spring being adapted to cooperate with a similar spring at the other end of the brake beam to center the brake beam laterally with respect to the side frames upon release of the brakes.

5. The combination as set forth in claim 4, wherein said spring is in the form of a finger separable from the wear plate but attached to the wear plate to form a unit therewith.

6. The combination as set forth in claim 4, wherein the spring is in the form of a finger integral with the corresponding wear plate.

7. In a car truck assembly, the combination comprising a pair of side frames for supporting a wheel axle therebetween and presenting on its inboard sides guide recesses, each formed with a back wall and a pair of side walls, a wear plate fitted in each of the guide recesses having a rear wall section adapted to lie along the back wall of the corresponding guide recess, a brake beam having its ends extending into the guide recesses and supported therein for guided movement towards and from braking position, the brake beam being shorter than the distance between the rear wall sections of the wear plates to allow limited lateral movement of the brake beam between the side frames, and a spring finger interposed between the rear wall section of each of the wear plates and the adjacent end of the brake beam to center automatically the brake beam laterally between the side frames upon release of the brakes, each spring finger being separable from the corresponding wear plate and having a clip for attachment to the rear wall section of the corresponding wear plate.

8. In a car truck assembly, the combination comprising a pair of side frames for supporting a wheel axle therebetween and presenting on its inboard sides guide recesses, each formed with a back wall and a pair of side walls, a wear plate fitted in each of the guide recesses having a rear wall section adapted to lie along the back wall of the corresponding guide recess, a brake beam having its ends extending into the guide recesses and supported therein for guided movements towards and from braking position, the brake beam being shorter than the distance between the rear wall sections of the wear plates to allow limited lateral movement of the brake beam between the side frames, and a spring finger interposed between the rear wall section of each of the wear plates and the adjacent end of the brake beam to center automatically the brake beam laterally between the side frames upon release of the brakes, each spring finger being integral with the corresponding wear plate and being cut out from and bent inwardly from the rear wall section of the corresponding wear plate.

9. In a car truck assembly, the combination comprising a pair of side frames for supporting a wheel axle therebetween and presenting on its inboard sides guide recesses, each formed with a back wall and a pair of side walls, a wear plate fitted in each of the guide recesses having a rear wall section adapted to lie along the back wall of the corresponding guide recess, and a brake beam having its ends extending into the guide recesses and supported therein for guided movement towards and from braking position, the brake beam being shorter than the distance between the rear wall sections of the wear plates to allow limited lateral movement of the brake beam between the side frames, each wear plate having integral therewith a single spring finger cut out of the rear wall section of the latter wear plate and bent inwardly therefrom, each of said spring fingers being interposed between the rear wall section of the corresponding wear plate and the adjacent end of the brake beam to center automatically the brake beam laterally between the side frames upon release of the brakes.

10. In a car truck assembly, the combination comprising a pair of side frames for supporting a wheel axle therebetween and presenting on its inboard sides guide recesses, each formed with a back wall and a pair of side walls, a wear plate fitted in each of the guide recesses having a rear wall section adapted to lie along the back wall of the corresponding guide recess, and a brake beam having its ends extending into the guide recesses and supported therein for guided movement towards and from braking position, the brake beam being shorter than the distance between the rear wall sections of the wear plates to allow limited lateral movement of the brake beam between the side frames, each wear plate having integral therewith a pair of longitudinally aligned spring fingers cut out of the rear wall section of the latter wear plate and bent inwardly with the free ends of the fingers confronting and opposite each other, each pair of aligned spring fingers being interposed between the rear wall section of the corresponding wear plate and the adjacent end of the brake beam to center automatically the brake beam laterally between the side frames upon release of the brakes.

11. In a car truck assembly, the combination comprising a pair of side frames for supporting a wheel axle therebetween and each having on its inboard side integral therewith a pair of parallel walls defining therebetween a channel-shaped guide recess, a channel-shaped wear plate fitted in each of the guide recesses and having a pair of opposed side wall sections and a rear wall section, a brake beam having its ends extending into the guide recesses and supported therein for guided movement towards and from braking position, the brake beam being shorter than the distance between the rear wall sections of the wear plates to allow limited lateral movement of the brake beam between the side frames, and a spring finger connected to the rear wall section of each wear plate and adapted to bear against the end of the brake beam extending into the corresponding guide recess to center automatically the brake beam laterally between the side frames upon release of the brakes.

12. In a car truck assembly, the combination comprising a pair of side frames for supporting a wheel axle therebetween and presenting on its inboard sides respective guide recesses each formed with a back wall, a wear plate fitted in each of the guide recesses and having a rear wall section adapted to lie opposite the back wall of the corresponding recess, a brake beam having its ends extending into the guide recesses and supported therein for guided movement towards and from braking position, the brake beam being shorter than the distance between the rear wall sections of the wear plates to allow limited lateral movement of the brake beam between the side frames, and a pair of spring devices acting at opposite ends of the brake beam for centering automatically the brake beam laterally between the side frames upon release of the brakes, each of said spring devices comprising a spring bar reversely bent at one end to form a clip attached to one end of the rear wall section of the corresponding wear plate and a finger section bent away from the rear wall section of the corresponding wear plate in position to engage the end of the brake beam in the corresponding guide recess.

13. In a car truck assembly, the combination as defined in claim 12, wherein one end of the rear wall section of the corresponding wear plate has a depression to nest therein the reversely bent end section of the corresponding spring bar, wherein the other free end of the finger section is offset towards the rear wall section of the corresponding wear plate, and wherein the latter rear wall section has a hole opposite the offset free end of the finger section to receive therein the offset end of the finger section in extreme stressed position of the finger section.

14. In a car truck assembly, the combination comprising a pair of side frames for supporting a wheel axle therebetween and presenting guide recesses on their inboard sides, each of the guide recesses being formed with a back wall and a side wall projecting inwardly from the corresponding side frame and having an upwardly facing support surface, a wear plate in the general form of an angle, having a guide section seated on the side wall of the corresponding guide recess, and an upstanding wall section against the back wall of the latter guide recess, a brake beam having its ends seated on the guide sections of the wear plates and short enough to allow lateral play of the brake beam between the side frames, and springs connected to the upstanding wall sections of the wear plates in position to engage the ends of the brake beam and to center the brake beam laterally with respect to the side frames when the brakes are released, each spring being integral with the corresponding wear plate and being cut out of its upstanding wall section, and bent inwardly therefrom in the form of a spring finger.

15. In combination, a wear plate with a rear wall section for one of the brake beam guide recesses of a railway car truck side frame, and a spring finger cut out of the rear wall section as to be integral therewith and bent from the rear wall section in position to engage resiliently one end of the brake beam in assembled position of the car truck and to urge the brake beam laterally away from the corresponding side frame, said spring being adapted to cooperate with a similar spring at the other end of the brake beam to center the brake beam laterally with respect to the side frames upon release of the brakes.

16. In combination, a one-piece channel-shaped wear plate of springy metal for protective use in a railway car truck having a side frame formed with a longitudinal brake-beam guide recess defined by upper and lower interconnected side walls and with its front side open, the inside width of which recess may in manufacture become varied or roughcast from a minimum to a maximum within a given limited range of width, said wear plate being adapted to be driven into wear-taking position within said guide recess regardless of the actual or effective width as manufactured of the recess within such limited range, the opposite side walls of said wear plate being flared outwardly from its back wall and from each other when the wear plate is normally unsprung, said wear plate in its unsprung flared condition having an outside width at its back wall approximately but slightly less than the minimum inside width of the guide recess and having an outside width at its flared open side approximating but slightly greater than the maximum inside width of the guide recess, whereby the wear plate when driven into the guide recess takes a sprung position and is thereby placed under sufficient internal stress to maintain a pressure fit between the wear plate side walls and the recess side walls for any width of recess falling within said limited range, and a spring device connected to the wear plate in position to engage resiliently one end of the brake beam in assembled position of the car truck and to urge the brake beam laterally away from the corresponding side frame, said spring device being adapted to cooperate with a similar spring device at the other end of the brake beam to center the brake beam laterally with respect to the side frames upon release of the brakes.

17. The combination as described in claim 16, wherein the spring device is separate from the wear plate and has a spring member and means for attaching the device to the wear plate in position to cause the spring member to engage resiliently the end of the brake beam in assembled position of the car truck and to urge the brake beam laterally away from the corresponding side frame.

18. The combination as described in claim 16, wherein the spring device is in the form of a finger cut out of and bent inwardly from the back wall of the wear plate and is integral with the latter wall.

References Cited in the file of this patent

UNITED STATES PATENTS

| | | |
|---|---|---|
| 1,033,139 | Williams | July 23, 1912 |
| 1,421,881 | Williams et al. | July 4, 1922 |
| 2,282,558 | Busch | May 12, 1942 |
| 2,310,195 | Busch | Feb. 2, 1943 |